(12) United States Patent
Kozuka (10) Patent No.: US 9,914,474 B2
(45) Date of Patent: Mar. 13, 2018

(54) VEHICULAR CONTROL APPARATUS

(71) Applicant: JTEKT CORPORATION, Osaka-shi, Osaka (JP)

(72) Inventor: Kenichi Kozuka, Chita (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/149,622

(22) Filed: May 9, 2016

(65) Prior Publication Data

US 2016/0339950 A1 Nov. 24, 2016

(30) Foreign Application Priority Data

May 21, 2015 (JP) ................. 2015-103940

(51) Int. Cl.
*B62D 5/04* (2006.01)
*B60W 50/04* (2006.01)

(52) U.S. Cl.
CPC ......... *B62D 5/0493* (2013.01); *B62D 5/0409* (2013.01); *B62D 5/0463* (2013.01); *B62D 5/0481* (2013.01); *B60W 2050/043* (2013.01)

(58) Field of Classification Search
CPC .. B62D 5/0493; B62D 5/0409; B62D 5/0463; B62D 5/0481; B60W 2050/043
See application file for complete search history.

(56) References Cited

U.S. PATENT DOCUMENTS 4,847,603 A * 7/1989 Blanchard .............. G02B 27/01
340/980
5,360,077 A 11/1994 Nishimoto et al.
2008/0215913 A1 9/2008 Terayama et al.
2009/0079435 A1 * 3/2009 Nakata .................. H02M 3/156
324/500
2011/0043323 A1 * 2/2011 Hamasako ............... G05B 9/03
340/3.43
2015/0220378 A1 * 8/2015 Kanamaru ............... G05B 9/03
714/37

FOREIGN PATENT DOCUMENTS

DE 10 2011 054435 A1 4/2012
JP 2013-159120 A 8/2013

OTHER PUBLICATIONS

Oct. 19, 2016 Search Report issued in European Patent Application No. 16169321.3.

* cited by examiner

*Primary Examiner* — Behrang Badii
*Assistant Examiner* — Daniel L Greene
(74) *Attorney, Agent, or Firm* — Oliff PLC

(57) ABSTRACT

A vehicular control apparatus that functions more reliably is provided. A quasi-abnormality control circuit brings one of a clock signal, an internal watchdog signal, and an answer signal into a quasi-abnormal state when an ignition is switched on. A clock determining circuit, an internal watchdog signal determining circuit, and a Q&A watchdog circuit output determination signals, respectively. One of the determination signals corresponds to a monitoring target signal brought into the quasi-abnormal state and indicates an abnormality. A reset signal determining circuit receives the determination signals, and generates a reset signal in accordance with determination results in the determination signals. A quasi-abnormality control circuit switches the monitoring target signal to be brought into the quasi-abnormal state each time the ignition is switched on.

5 Claims, 5 Drawing Sheets

VEHICULAR CONTROL APPARATUS

INCORPORATION BY REFERENCE

The disclosure of Japanese Patent Application No. 2015-103940 filed on May 21, 2015 including the specification, drawings and abstract, is incorporated herein by reference in its entirety.

BACKGROUND OF THE INVENTION

1. Field of the Invention

The invention relates a vehicular control apparatus.

2. Description of the Related Art

Electric power steering systems (EPS) are known which apply power of a motor to a steering mechanism of a vehicle to assist a driver's steering operation. Such a motor is controlled by a microcomputer. The microcomputer performs current feedback control to control driving of the motor in order to allow a current value of a current actually applied to the motor to track a current command value.

In some EPSs, a central processing unit (hereinafter referred to as a CPU) included in the microcomputer is duplicated in order to enhance safety and reliability. For example, an EPS described in Japanese Patent Application Publication No. 2013-159120 (JP 2013-159120 A) has a main CPU that mainly performs driving control of the motor and a sub CPU that monitors operations of the main CPU.

In some EPSs, instead of the CPU, the microcomputer is duplicated. A sub-microcomputer executes a process of resetting a main microcomputer if the main microcomputer becomes abnormal. To reliably execute the resetting process, the sub-microcomputer causes a quasi-abnormality in a signal from the main microcomputer that is a monitoring target signal during an initial check time at the time of switch-on of an ignition. When the signal from the main microcomputer is normalized as a result of the resetting process executed to eliminate the quasi-abnormality, whether a path on which the resetting process is executed functions normally is checked.

However, due to a constraint on the initial check time at the time of switch-on of the ignition in the vehicle, whether the resetting process is executed on all of the monitoring targets of the main microcomputer cannot be checked. Thus, paths on which the check for the resetting process is not executed fail to be checked for normal functioning.

In this case, even when an abnormality occurs in the main microcomputer becomes abnormal, the resetting process fails to be reliably executed on the main microcomputer. Thus, the main microcomputer may continue to be abnormal. Such a phenomenon is not limited to the microcomputer or CPU in the EPS but is common to control apparatuses mounted in vehicles.

SUMMARY OF THE INVENTION

An object of the present invention is to provide a vehicular control apparatus that has enhanced safety and reliability and that functions more reliably.

A vehicular control apparatus in an aspect of the invention includes:

a control circuit that controls an operation of a vehicle to generate a plurality of signals, a monitoring circuit that monitors the signals to monitor an operation of the control circuit, an abnormality causing circuit that selects one of the signals and that causes a quasi-abnormality in the selected signal, and a reset determining circuit that resets the control circuit when the selected signal is determined to be abnormal. The abnormality causing circuit switches the signal to be brought into a quasi-abnormal state from the selected signal to another signal each time the vehicle is powered on.

In this configuration, the signal to be brought into the quasi-abnormal state is switched from the selected signal to another signal each time the vehicle is powered on. Consequently, detection of an abnormality is performed on each signal to allow checking of whether the control circuit is to be reset. An initial time following power-on of the vehicle is limited, and thus, it is difficult to perform detection of an abnormality on a plurality of signals to check whether the control circuit is to be reset. However, detection of an abnormality can be performed on a plurality of signals by switching the signal to be brought into the quasi-abnormal state. Thus, even when the control circuit becomes abnormal, whether the control circuit is to be reset can be checked, allowing the vehicular control apparatus to function reliably.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
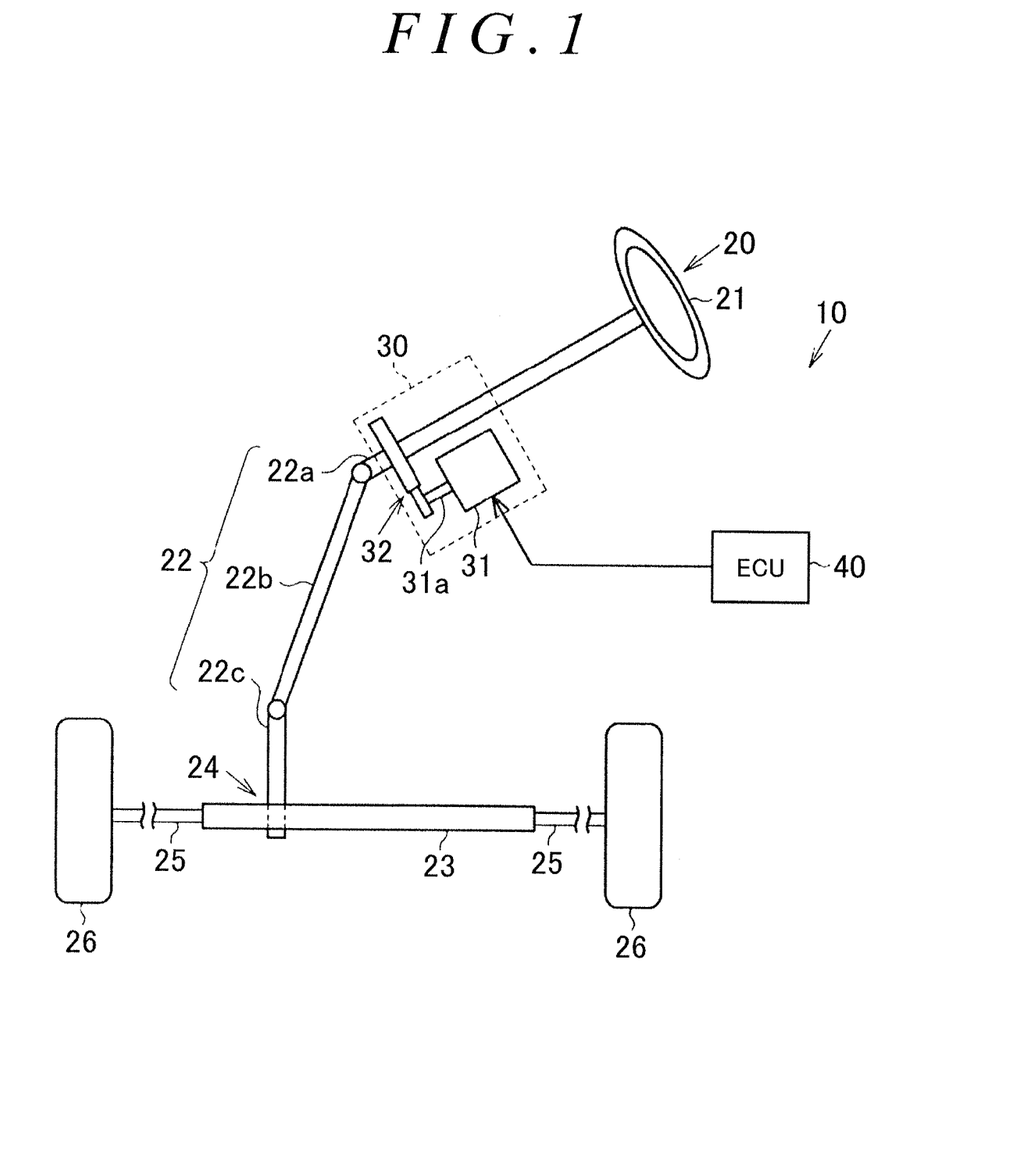
FIG. 1 is a configuration diagram depicting a general configuration of an electric power steering apparatus to which a vehicular control apparatus in the present embodiment is applied.

An embodiment will be described below in which a vehicular control apparatus in the invention is applied to an electric power steering apparatus (EPS). As depicted in FIG. 1, an EPS 10 includes a steering mechanism 20 that steers steered wheels 26 based on a driver's operation of a steering wheel 21, an assist mechanism 30 that assists the driver's steering operation, and an electronic control unit (ECU) 40 serving as a vehicular control apparatus that controls the assist mechanism 30.

The steering mechanism 20 includes a steering wheel 21 and a steering shaft 22 that rotates integrally with the steering wheel 21. The steering shaft 22 has a column shaft 22a coupled to the steering wheel 21, an intermediate shaft 22b coupled to a lower end of the column shaft 22a, and a pinion shaft 22c coupled to a lower end of the intermediate shaft 22b. A lower end of the pinion shaft 22c is coupled to a rack shaft 23 (to be exact, rack teeth on the rack shaft 23). Therefore, the steering mechanism 20 converts rotary motion of the steering shaft 22 into reciprocating linear motion of the rack shaft 23 in an axial direction (a lateral direction in FIG. 1) via a rack-and-pinion mechanism 24 including pinion teeth provided at a tip of the pinion shaft 22c and rack teeth formed on the rack shaft 23. The reciprocating linear motion is transmitted to each of the right and left steered wheels 26 via tie rods 25 coupled to the opposite ends of the rack shaft 23, to change a steered angle of the steered wheels 26.

The assist mechanism 30 includes a motor 31 that is a source of an assist force. A rotating shaft 31*a* of the motor 31 is coupled to the column shaft 22*a* via a speed reduction mechanism 32. The speed reduction mechanism 32 reduces the speed of rotation output from the motor 31 to transmit the force of the rotation with the speed thereof reduced, to the column shaft 22*a*. That is, the rotation force (torque) of the motor 31 is applied to the steering shaft 22 as an assist force to assist the driver's steering operation.

The ECU 40 controls the motor 31 based on detection results from various sensors provided in the vehicle. The ECU 40 sets a target assist force based on outputs from the various sensors, and controls a current supplied to the motor 31 so as to make the actual assist force equal to the target assist force. Driving control of the motor 31 by the ECU 40 is started after completion of an initial check following switch-on of the ignition in the vehicle.

Figure 2:
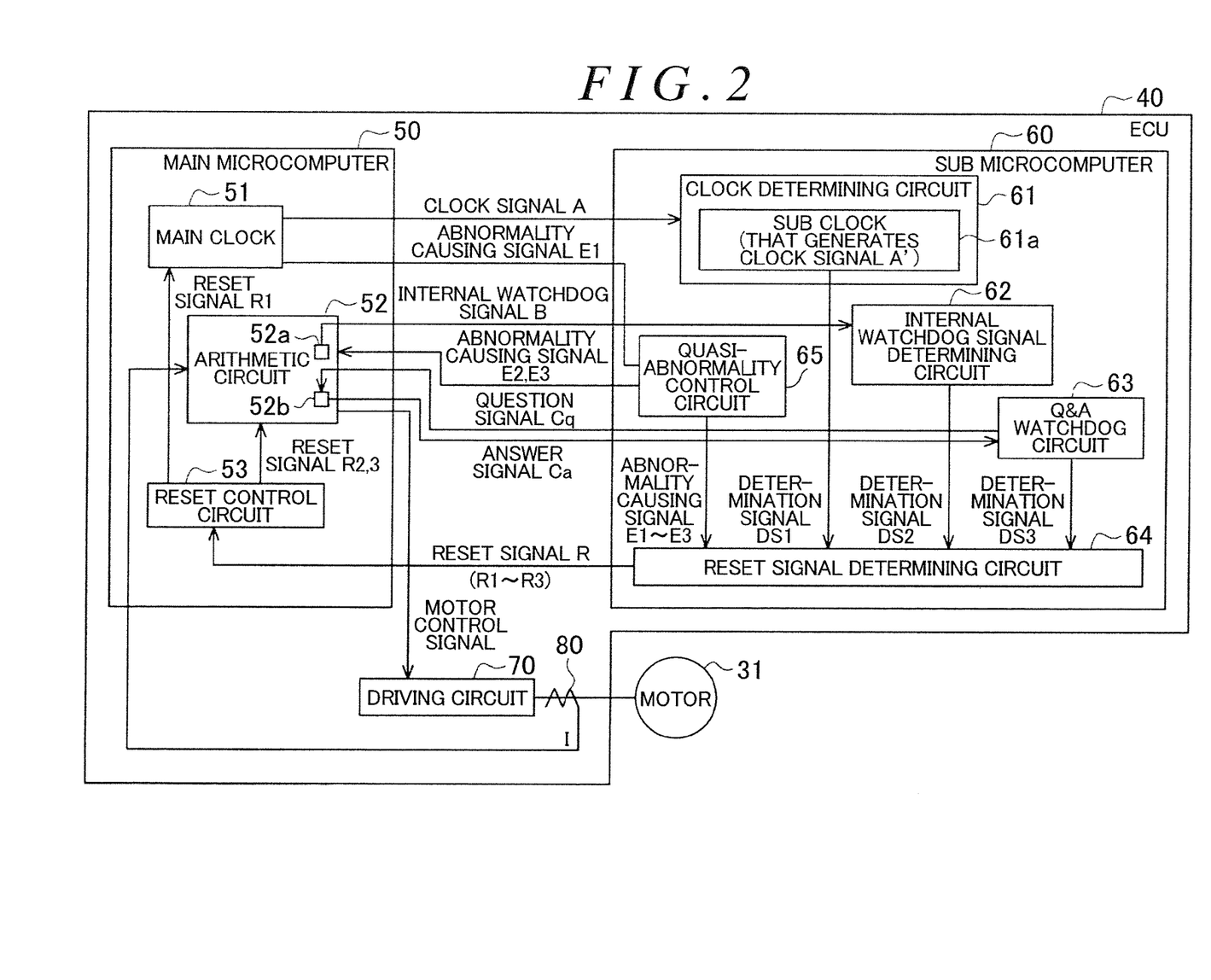
FIG. 2 is a block diagram depicting a general configuration of an ECU in the present embodiment.

As depicted in FIG. 2, the ECU 40 includes a main microcomputer 50 that performs driving control of the motor 31, a sub microcomputer 60 that monitors operations of the main microcomputer 50, and a driving circuit 70 that supplies a current to the motor 31.

The main microcomputer 50 includes a main clock 51 that generates a clock signal A based on a preset frequency, an arithmetic circuit 52 that executes a calculation for driving the motor 31, and a reset control circuit 53 that resets circuits in the main microcomputer 50.

The clock signal A generated by the main clock 51 is a signal that repeatedly becomes high and low at preset periods. The main microcomputer 50 executes an arithmetic process based on the clock signal A. The main clock 51 outputs the clock signal A to the sub microcomputer 60 at preset periods.

The arithmetic circuit 52 acquires state variables (a steering torque and the like) detected by various sensors not depicted in the drawings and calculates a current command value allowing the motor 31 to generate an assist force in accordance with the steering torque. The current command value is a target value for a driving current for the motor 31 and corresponds to a target value for an output torque from the motor 31. The arithmetic circuit 52 performs current feedback control in accordance with a deviation between an actual current value I obtained from a current sensor 80 and the current command value, and generates a motor control signal. Controlled variables in the present invention are, for example, the current command value and the motor control signal.

The arithmetic circuit 52 also has an internal watchdog circuit 52*a* and an internal arithmetic circuit 52*b*. The internal watchdog circuit 52*a* is provided to allow the arithmetic circuit 52 to make self-determination of whether or not the arithmetic circuit 52 is normal. The internal watchdog circuit 52*a* generates an internal watchdog signal B. The internal watchdog signal B is a pulse signal that changes between a high level and a low level at given periods when normal but that has its periodicity disturbed if the arithmetic circuit 52 becomes abnormal. The internal watchdog circuit 52*a* outputs the internal watchdog signal B to the sub microcomputer 60. The internal arithmetic circuit 52*b* calculates an answer signal Ca based on a question signal Cq received from the sub microcomputer 60, and outputs the answer signal Ca to the sub microcomputer 60.

The sub microcomputer 60 includes a clock determining circuit 61, an internal watchdog signal determining circuit 62, a Q&A watchdog circuit 63, a reset signal determining circuit 64 that generates a reset signal R, and a quasi-abnormality control circuit 65 that brings a monitoring target signal into a quasi-abnormal state. The clock determining circuit 61 determines whether or not the main microcomputer 50 is normal based on the clock signal A. The internal watchdog signal determining circuit 62 determines whether or not the main microcomputer 50 is normal based on the internal watchdog signal B. The Q&A watchdog circuit 63 determines whether or not the main microcomputer 50 is normal based on the answer signal Ca output from the internal arithmetic circuit 52*b*. The reset signal determining circuit 64 generates a signal that allows resetting of an abnormal portion of the main microcomputer 50 (the main clock 51 or the arithmetic circuit 52), based on determination results from the clock determining circuit 61, the internal watchdog signal determining circuit 62, and the Q&A watchdog circuit 63. The clock signal A, the internal watchdog signal B, and the answer signal Ca are monitoring target signals.

The clock determining circuit 61 has a sub clock 61*a*. The sub clock 61*a* generates a clock signal A' that repeatedly becomes high and low at preset periods. The clock signal A' has a frequency corresponding to the clock signal A. For example, the frequency of the clock signal A' is set equal to the frequency of the clock signal A. The clock determining circuit 61 determines whether or not the main clock 51 is normal based on the clock signal A output from the main clock 51 and the clock signal A' generated by the sub clock 61*a*.

That is, the clock determining circuit 61 compares the clock signal A with the clock signal A' and determines that the main clock 51 is normal when both signals have an equal value. The clock determining circuit 61 compares the clock signal A with the clock signal A' and determines that the main clock 51 is abnormal when the signals have different values. Based on the determination of whether or not the main clock 51 is normal, the clock determining circuit 61 generates and outputs a determination signal DS1 to the reset signal determining circuit 64. The determination signal DS1 contains not only the information indicating whether or not the main clock 51 is normal but also information indicating that a communication path for the clock signal A is normal and information indicating that the clock signal A' is also estimated to be normal.

The internal watchdog signal determining circuit 62 receives the internal watchdog signal B output from the internal watchdog circuit 52*a* in the arithmetic circuit 52. Based on the internal watchdog signal B, the internal watchdog signal determining circuit 62 determines whether or not the arithmetic circuit 52 is normal. Specifically, the internal watchdog signal determining circuit 62 determines that the arithmetic circuit 52 is abnormal when the internal watchdog signal B is output at a different period or when the internal watchdog signal B is not output. In contrast, when the internal watchdog signal B is received at given periods, the internal watchdog signal determining circuit 62 determines that the arithmetic circuit 52 is normal. The internal watchdog signal determining circuit 62 generates a determination signal DS2 based on the received internal watchdog signal B, and outputs the determination signal DS2 to the reset signal determining circuit 64.

The Q&A watchdog circuit 63 performs bidirectional communication with the internal arithmetic circuit 52*b* in the arithmetic circuit 52. Specifically, the Q&A watchdog circuit 63 outputs the question signal Cq to the internal arithmetic circuit 52b at preset periods. For example, the question signal Cq is a signal that questions the internal arithmetic circuit 52b about the result of calculation of a current command value I* executed by the internal arithmetic circuit 52b. The internal arithmetic circuit 52b executes a calculation in accordance with the question signal Cq to generate an answer signal Ca corresponding to the question signal Cq. The Q&A watchdog circuit 63 can determine whether or not the arithmetic circuit 52 (to be exact, the internal arithmetic circuit 52b) is normal by checking whether or not the answer signal Ca is appropriate for the question signal Cq. When the answer signal Ca is appropriate, the Q&A watchdog circuit 63 determines that the internal arithmetic circuit 52b is normal. The Q&A watchdog circuit 63 generates a determination signal DS3 based on the question signal Cq and the answer signal Ca and outputs the determination signal DS3 to the reset signal determining circuit 64.

The quasi-abnormality control circuit 65 performs control so as to bring one of the clock signal A, the internal watchdog signal B, and the answer signal Ca, which are the monitoring targets, into the quasi-abnormal state when the ignition is switched on. The quasi-abnormal state is not such a true abnormality as to affect the driving control of the motor 31 or the like but is a state that is not abnormal enough to affect the driving control of the motor 31 or the like.

Specifically, the quasi-abnormality control circuit 65 outputs an abnormality causing signal E1 to the main clock 51 in order to cause a quasi-abnormal clock signal A to be generated. Upon receiving the abnormality causing signal E1, the main clock 51 generates and outputs a quasi-abnormal clock signal A to the clock determining circuit 61. The main clock 51 may bring the clock signal A into the quasi-abnormal state by omitting the output of the clock signal A. In order to cause a quasi-abnormal internal watchdog signal B to be generated, the quasi-abnormality control circuit 65 outputs an abnormality causing signal E2 to the arithmetic circuit 52 (to be exact, the internal watchdog circuit 52a). Upon receiving the abnormality causing signal E2, the internal watchdog circuit 52a generates and outputs a quasi-abnormal internal watchdog signal B to the internal watchdog signal determining circuit 62. The internal watchdog signal B may be brought into the quasi-abnormal state by omitting the output of the internal watchdog signal B.

In order to cause a quasi-abnormal answer signal Ca to be generated, the quasi-abnormality control circuit 65 outputs an abnormality causing signal E3 to the arithmetic circuit 52 (to be exact, the internal arithmetic circuit 52b). Upon receiving the abnormality causing signal E3, the arithmetic circuit 52 generates and outputs a quasi-abnormal answer signal Ca to the Q&A watchdog circuit 63. For example, upon receiving the abnormality causing signal E3, the arithmetic circuit 52 generates an answer signal Ca with an inappropriate answer to the question signal Cq. The quasi-abnormal answer signal Ca may be output by omitting the output of the answer signal Ca or outputting the answer signal Ca at a different period. In order to cause a quasi-abnormal signal to be generated, the quasi-abnormality control circuit 65 outputs one of the abnormality causing signals E1 to E3 to the reset signal determining circuit 64.

The quasi-abnormality control circuit 65 also has a function to switch the monitoring target signal to be brought into the quasi-abnormal state each time the ignition is switched on. That is, the quasi-abnormality control circuit 65 determines the current monitoring target signal to be brought into the quasi-abnormal state based on which of the clock signal A, the internal watchdog signal B, and the answer signal Ca is the signal brought into the quasi-abnormal state during the initial check at the time of the last switch-on of the ignition. Specifically, when the last monitoring target signal is the clock signal A, the current monitoring target signal is set to be the internal watchdog signal B. When the current monitoring target signal is the internal watchdog signal B, the next monitoring target signal is set to be the answer signal Ca, and the monitoring target signal after the next monitoring target signal is set to be the clock signal A again. That is, each time the ignition is switched on, the monitoring target signal is switched among the clock signal A, the internal watchdog signal B, and the answer signal Ca in this order in rotation.

The reset signal determining circuit 64 receives the determination signals DS1 to DS3. The reset signal determining circuit 64 generates a reset signal R in accordance with the determination results in the determination signals DS1 to DS3. The reset signal R is a signal for resetting the main microcomputer 50 as a whole. The reset signal determining circuit 64 outputs the reset signal R to the reset control circuit 53 in the main microcomputer 50. The reset signal R is generated, for example, when an abnormality is detected in the monitoring target signal while the vehicle is traveling.

The reset signal determining circuit 64 can generate not only the reset signal R but also a signal for resetting a portion of the main microcomputer 50, which corresponds to one of the determination signals DS1 to DS3. Specifically, the reset signal determining circuit 64 generates a reset signal R1 for resetting the main clock 51 when the determination signal DS1 is indicative of an abnormality. The reset signal determining circuit 64 generates a reset signal R2 for resetting the arithmetic circuit 52 (to be exact, the internal watchdog circuit 52a) when the determination signal DS2 is indicative of an abnormality. The reset signal determining circuit 64 generates a reset signal R3 for resetting the arithmetic circuit 52 (to be exact, the internal arithmetic circuit 52b) when the determination signal DS3 is indicative of an abnormality. One of the reset signals R1 to R3 is generated, for example, when an abnormality is detected in the corresponding monitoring target signal during the initial check at the time of switch-on of the ignition.

The reset control circuit 53 receives the reset signal R or one of the reset signals R1 to R3 output from the reset signal determining circuit 64. Upon receiving the reset signal R, the reset control circuit 53 resets the main microcomputer 50 as a whole based on the reset signal R. That is, in addition to outputting one of the reset signals R1 to R3 to the corresponding portion of the main microcomputer 50 (the main clock 51 or the arithmetic circuit 52), the reset control circuit 53 outputs the reset signal to portions of the main microcomputer 50 (not depicted in the drawings) that are not directly related to the monitoring target signal.

When the reset signal R1 is input to the reset control circuit 53, the reset control circuit 53 outputs the reset signal R1 to the main clock 51 to reset the main clock 51. When the reset signal R2 is input to the reset control circuit 53, the reset control circuit 53 outputs the reset signal R2 to the internal watchdog circuit 52a to reset the internal watchdog circuit 52a. When the reset signal R3 is input to the reset control circuit 53, the reset control circuit 53 outputs the reset signal R3 to the internal arithmetic circuit 52b to reset the internal arithmetic circuit 52b.

Figure 3A:
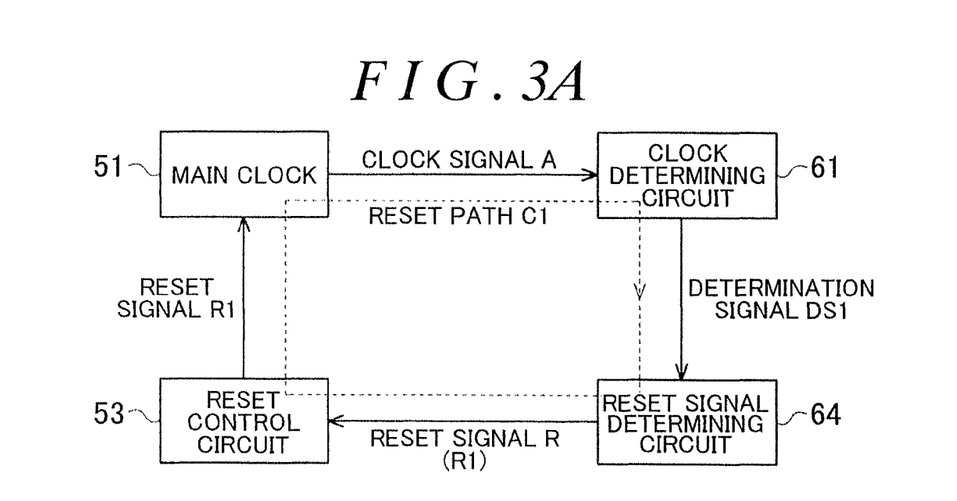
FIG. 3A is a block diagram depicting a general path of a reset path in the present embodiment.

Reset paths will be described in detail that allow resetting of a portion of the main microcomputer 50, which generates a monitoring target signal. As depicted in FIG. 3A, a reset path C1 for the main clock 51 (that outputs the clock signal A) includes the main clock 51, the clock determining circuit

61, the reset signal determining circuit 64, the reset control circuit 53, and communication paths between these circuits. In the case where a quasi-abnormal clock signal A is generated in the main clock 51, when the reset control circuit 53 outputs the reset signal R1 to the main clock 51 to reset the main clock 51, the reset path C1 can be determined to function soundly. In contrast, when the main clock 51 is not reset in spite of the reset signal R1 output from the reset control circuit 53 to the main clock 51, the reset path C1 can be determined not to function soundly.

Figure 3B:
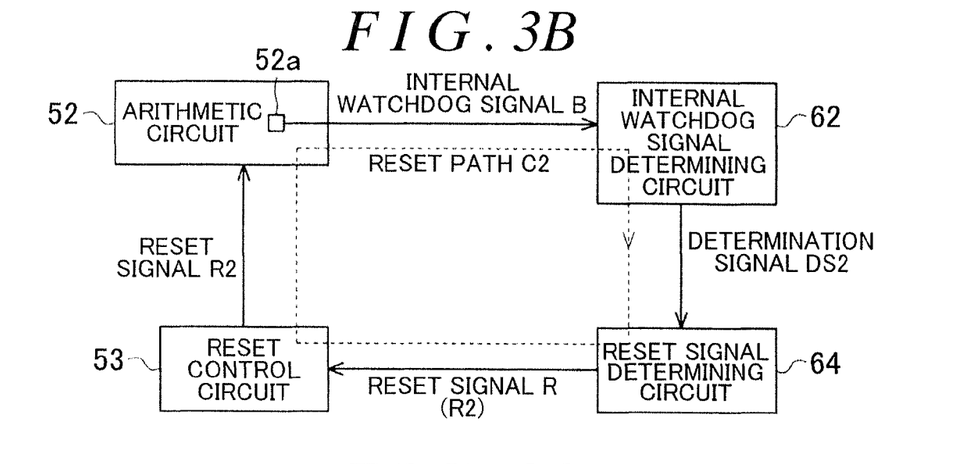
FIG. 3B is a block diagram depicting a general path of a reset path in the present embodiment.

As depicted in FIG. 3B, a reset path C2 for the internal watchdog circuit 52a (that outputs the internal watchdog signal B) includes the internal watchdog circuit 52a in the arithmetic circuit 52, the internal watchdog signal determining circuit 62, the reset signal determining circuit 64, the reset control circuit 53, and communication paths between these circuits. In the case where a quasi-abnormal internal watchdog signal B is generated in the internal watchdog circuit 52a, when the reset control circuit 53 outputs the reset signal R2 to the internal watchdog circuit 52a to reset the internal watchdog circuit 52a, the reset path C2 can be determined to function soundly. In contrast, when the internal watchdog circuit 52a is not reset in spite of the reset signal R2 output from the reset control circuit 53 to the internal watchdog circuit 52a, the reset path C2 can be determined not to function soundly.

Figure 3C:
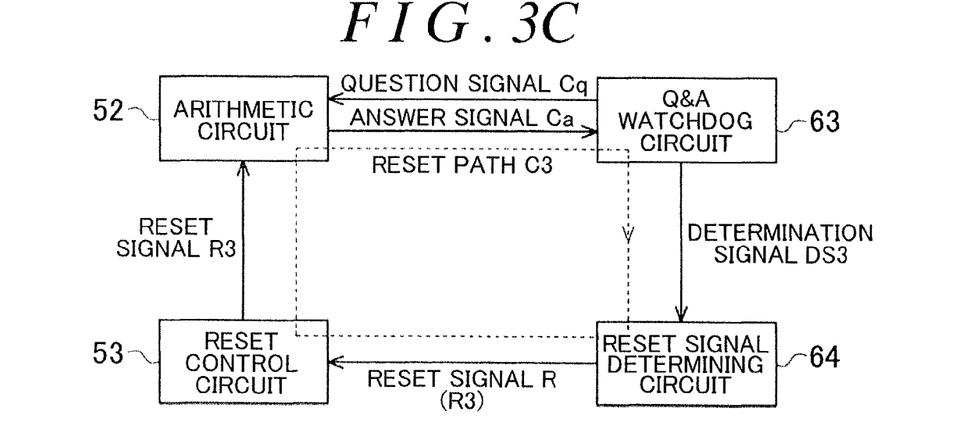
FIG. 3C is a block diagram depicting a general path of a reset path in the present embodiment.

As depicted in FIG. 3C, a reset path C3 for the internal arithmetic circuit 52b (that receives the question signal Cq and outputs the answer signal Ca) includes the internal arithmetic circuit 52b in the arithmetic circuit 52, the Q&A watchdog circuit 63, the reset signal determining circuit 64, the reset control circuit 53, and communication paths between these circuits. In the case where a quasi-abnormal answer signal Ca is generated in the internal arithmetic circuit 52b, when the reset control circuit 53 outputs the reset signal R to the internal arithmetic circuit 52b to reset the internal arithmetic circuit 52b, the reset path C3 can be determined to function soundly. In contrast, when the internal arithmetic circuit 52b is not reset in spite of the reset signal R3 output from the reset control circuit 53 to the internal arithmetic circuit 52b, the reset path C3 can be determined not to function soundly.

Effects of the present embodiment will be described. First, the initial check on the reset paths C1 to C3 executed when the ignition is switched on will be described. The initial check is a characteristic part of the present embodiment. Description will be made below in accordance with a sequence chart in FIGS. 4A and 4B.

Figure 4A:
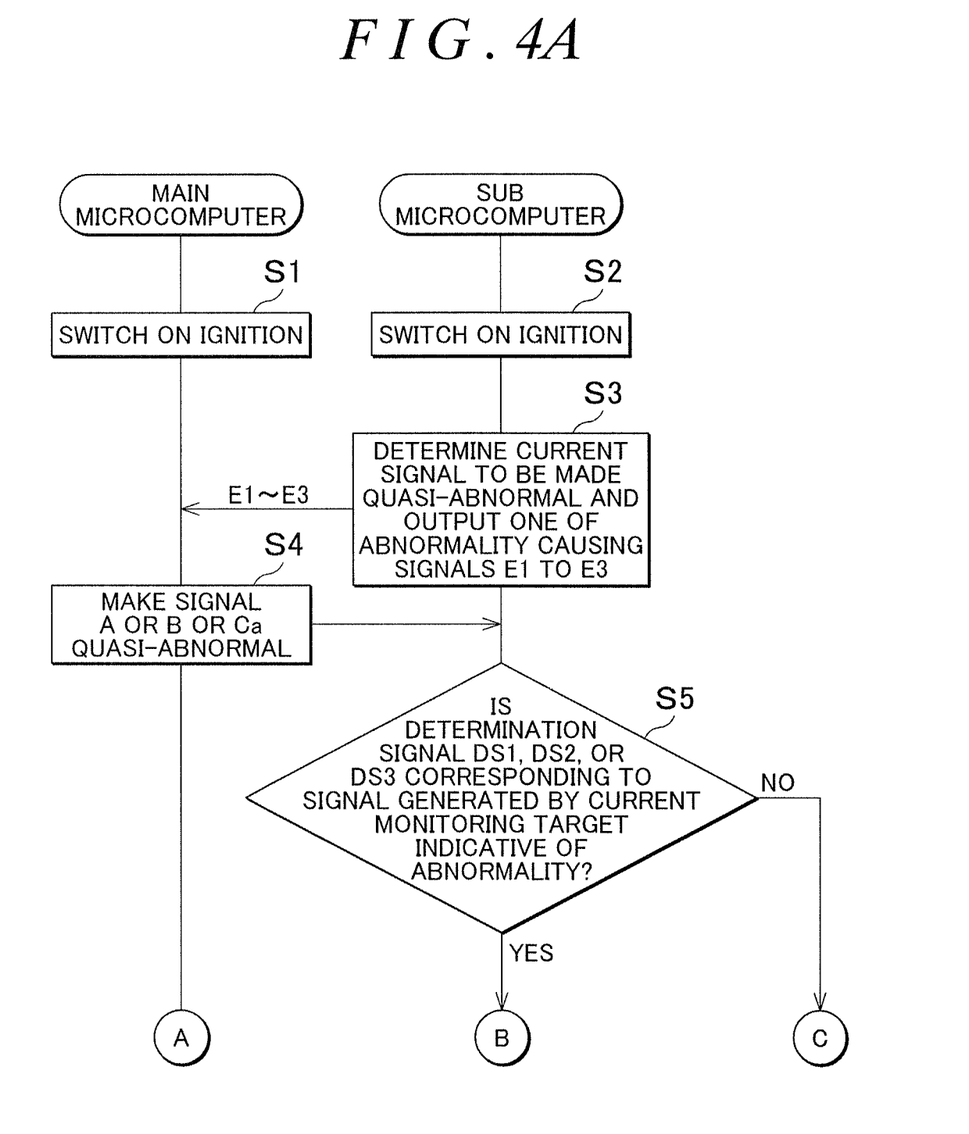
FIGS. 4A and 4B are sequence charts illustrating operations of a main microcomputer and a sub microcomputer in the present embodiment.
Figure 4B:
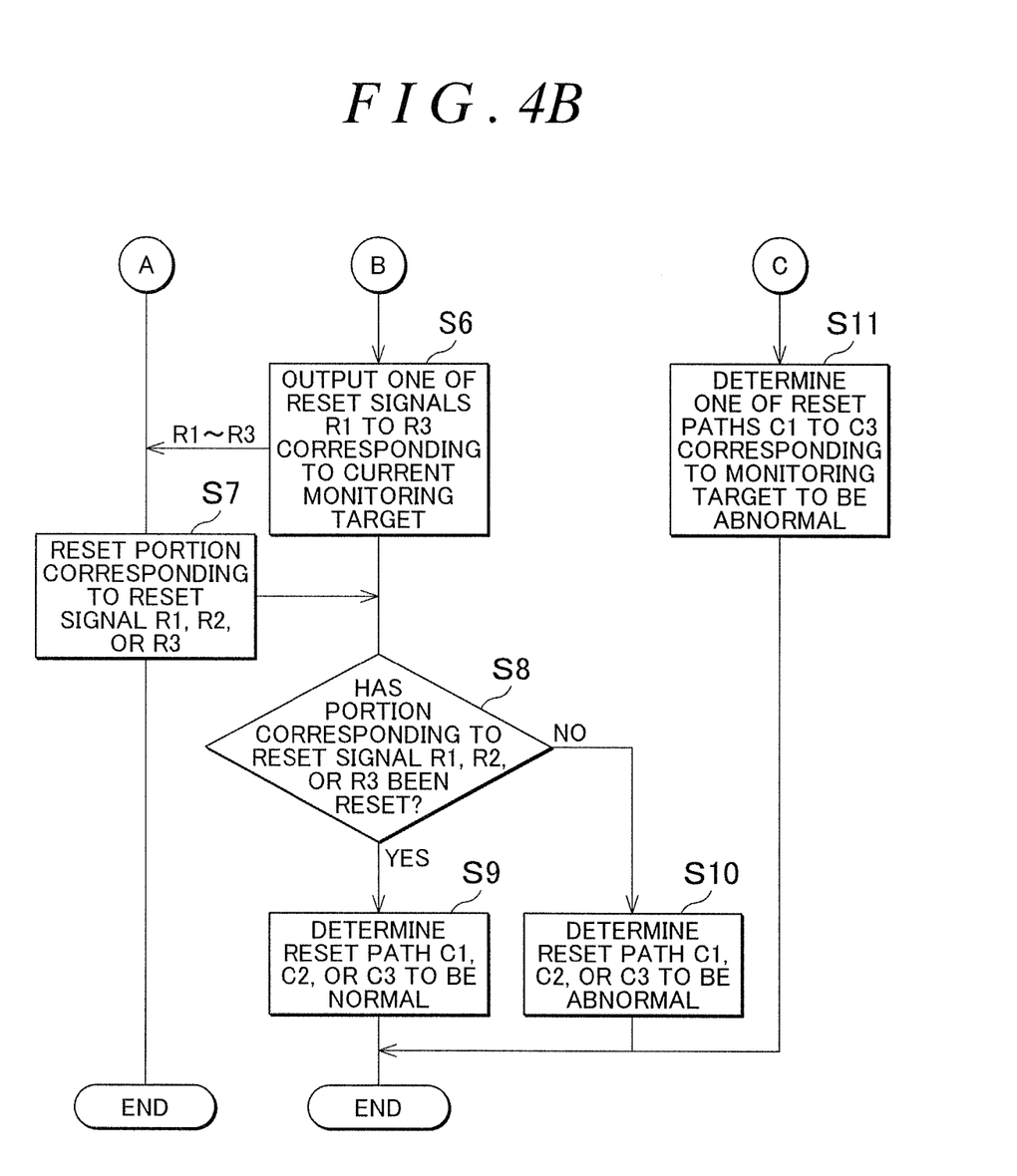

While the ignition is off, the main microcomputer 50 and the sub microcomputer 60 are supplied with no power and stopped. When the ignition is switched on, the main microcomputer 50 and the sub microcomputer 60 start to be driven and start the initial checks (steps S1 and S2).

The sub microcomputer 60 determines the current monitoring target signal (step S3). If any signal is brought into the quasi-abnormal state during the last initial check, that signal is switched to a signal from a monitoring target different from the last monitoring target, which is set to be the current monitoring target. The sub microcomputer 60 (quasi-abnormality control circuit 65) outputs one of the abnormality causing signals E1 to E3 to the current monitoring target.

Specifically, when bringing the clock signal A into the quasi-abnormal state, the quasi-abnormality control circuit 65 outputs the abnormality causing signal E1 to the main clock 51. When bringing the internal watchdog signal B into the quasi-abnormal state, the quasi-abnormality control circuit 65 outputs the abnormality causing signal E2 to the internal watchdog circuit 52a. When bringing the answer signal Ca into the quasi-abnormal state, the quasi-abnormality control circuit 65 outputs the abnormality causing signal E3 to the internal arithmetic circuit 52b. The quasi-abnormality control circuit 65 also outputs one of the abnormality causing signals E1 to E3 to the reset signal determining circuit 64.

The main microcomputer 50 brings the monitoring target signal (the clock signal A, the internal watchdog signal B, or the answer signal Ca) into the quasi-abnormal state based on the abnormality causing signal E1, E2, or E3 (step S4).

The sub microcomputer 60 determines whether or not one of the determination signals DS1 to DS3 that corresponds to the signal (the clock signal A, the internal watchdog signal B, or the answer signal Ca) generated by the current monitoring target is indicative of an abnormality (step S5). In other words, the sub microcomputer 60 determines whether the determination signal DS1, DS2, or DS3 corresponding to the abnormality causing signal E1, E2, or E3, respectively, is indicative of an abnormality.

Specifically, when bringing the clock signal A into the quasi-abnormal state, the reset signal determining circuit 64 receives the abnormality causing signal E1 output from the quasi-abnormality control circuit 65 and the determination signal DS1 output from the clock determining circuit 61. The reset signal determining circuit 64 determines whether the determination signal DS1 corresponding to the abnormality causing signal E1 is indicative of an abnormality. In other words, the reset signal determining circuit 64 determines whether or not the determination signal DS1 corresponding to the clock signal A output from the current monitoring target is abnormal.

When the determination signal DS1, DS2, or DS3 corresponding to the signal generated by the current monitoring target is indicative of an abnormality (YES in step S5), the sub microcomputer 60 outputs the corresponding reset signal R1, R2, or R3 to the main microcomputer 50 (reset control circuit 53) (step S6). Specifically, to reset the abnormality in the main clock 51, which has resulted in generation of the determination signal DS1, the reset signal determining circuit 64 in the sub microcomputer 60 outputs the reset signal R1 to the reset control circuit 53.

The main microcomputer 50 receives the reset signal R1, R2, or R3 from the sub microcomputer 60 and resets the portion of the main microcomputer 50 corresponding to the reset signal R1, R2, or R3 (step S7) to end the process. For example, upon receiving the reset signal R1, the main microcomputer 50 resets the main clock 51.

The sub microcomputer 60 determines whether the portion of the main microcomputer 50, which corresponds to the reset signal R1, R2, or R3, has been reset (step S8). Whether the portion has been reset can be determined, for example, depending on whether the corresponding determination signal DS1, DS2, or DS3 indicative of an abnormality has changed to indicate normality.

When the portion corresponding to the reset signal R1, R2, or R3 has been reset (in step S8, YES), the corresponding one of the reset paths C1 to C3 is determined to function normally, and the process is ended (step S9). In contrast, when the portion corresponding to the reset signal R1, R2, or R3 has not been reset (in step S8, NO), the corresponding reset path C1, C2, or C3 is determined not to function normally (step S10). The process is ended.

In the determination in step S5 described above, when the determination signal DS1, DS2, or DS3 corresponding to the signal generated by the current monitoring target is not indicative of an abnormality in spite of the corresponding abnormality causing signal E1, E2, or E3 output from the sub microcomputer 60 (step S5, NO), the reset path C1, C2, or C3 corresponding to the monitoring target is determined to be abnormal (step S11). For example, if the determination signal DS1 is not indicative of an abnormality even though the clock signal A has been brought into the quasi-abnormal state, then for example, the clock determining circuit 61 may have been abnormal or disconnection may have occurred on the communication path for the reset signal R1.

Thus, the check on the soundness of the reset path C1, C2, or C3 during the initial check is ended. Then, at the time of the next switch-on of the ignition, a signal different from the current monitoring target signal is set to be a monitoring target, and the corresponding reset path C1, C2, or C3 is checked for soundness. Consequently, all the reset paths C1 to C3 are sequentially checked for soundness.

If the reset path C1, C2, or C3 is abnormal, a preset process such as stoppage of operation of the ECU 40 itself is executed. This is because resetting cannot be executed due to an abnormality in the reset path C1, C2, or C3 corresponding to the signal brought into the quasi-abnormal state.

Effects of the present embodiment will be described. (1) The monitoring target signal is brought into the quasi-abnormal state during the initial check at the time of switch-on of the ignition to allow checking of whether all of the reset paths C1 to C3 are sound. During the initial check, a sufficient time cannot be taken, and thus, checking whether all the reset paths C1 to C3 are sound is temporally difficult. However, whether all the reset paths C1 to C3 are sound can be checked by switching the reset path to be checked for soundness each time the ignition is switched on. Thus, more reset paths C1 to C3 can be checked for soundness, and even upon becoming abnormal, the main microcomputer 50 can be more reliably reset. This allows the main microcomputer 50 to function more reliably.

(2) During the initial check at the time of switch-on of the ignition, resetting is performed on each path to be checked for soundness, further reducing the time needed to check the reset paths for soundness. That is, compared to resetting the entire main microcomputer 50, resetting only of the quasi-abnormal portion of the main microcomputer 50 enables a further reduction in the time from resetting of the main microcomputer 50 until the main microcomputer 50 returns to normal driving.

The present embodiment may be modified as follows. In the present embodiment, the signal output from the main microcomputer 50 is brought into the quasi-abnormal state. However, the invention is not limited to this. For example, the signal output from the sub microcomputer 60 may be brought into the quasi-abnormal state, or a quasi-abnormality may be caused by preventing the sub microcomputer 60 from receiving the signals output from the main microcomputer 50.

In the present embodiment, the reset signal determining circuit 64 is provided in the sub microcomputer 60. The invention is not limited to this. For example, the reset signal determining circuit 64 may be provided in the main microcomputer 50 or outside the main microcomputer 50 and the sub microcomputer 60.

The present embodiment uses the main microcomputer 50 and the sub microcomputer 60. However, the invention is not limited to this. For example, a CPU or an integrated circuit (IC) may be used. That is, any electronic component may be used.

In the present embodiment, driving of the main microcomputer 50 is monitored by the sub microcomputer 60. However, the invention is not limited to this. That is, driving of the sub microcomputer 60 may be monitored by the main microcomputer 50, or the main microcomputer 50 and the sub microcomputer 60 may monitor each other.

In the present embodiment, all the reset paths C1 to C3 are checked for soundness by switching the reset path to be checked for soundness in rotation each time the ignition is switched on. However, the invention is not limited to this. That is, switching may be randomly executed among the the reset paths or the same reset path may be continuously checked for soundness.

In the present embodiment, the frequency of the clock signal A' is set equal to the frequency of the clock signal A. However, the invention is not limited to this. For example, the frequencies of the clock signals A' and A may be set to have a divisor relation.

In the present embodiment, the sub clock 61a is provided in the clock determining circuit 61. However, the sub clock 61a may be omitted from the clock determining circuit 61. In this case, whether or not an abnormality is present can be determined based on whether the frequency of the main clock 51 stored in the clock determining circuit 61 is equal to the frequency of the clock signal A.

In the present embodiment, the quasi-abnormality control circuit 65 in the sub microcomputer 60 determines the signal to be brought into the quasi-abnormal state. However, the invention is not limited to this. For example, the main microcomputer 50 may be provided with the quasi-abnormality control circuit 65.

If a constraint on the time for the initial check is lax, then after the first resetting process during the initial check at the time of switch-on of the ignition, the second resetting process may be executed by bringing another monitoring target signal into the quasi-abnormal state again. That is, the resetting process may be executed a plurality of times within the time for the initial check.

In the present embodiment, one of the clock signal A, the internal watchdog signal B, and the answer signal Ca is used as the monitoring target signal. However, the invention is not limited to this. For example, four or more signals may be monitored, or two signals may be monitored.

In the present embodiment, when resetting is executed during the initial check at the time of switch-on of the ignition, the quasi-abnormal portion of the main microcomputer 50 is reset using the reset signal R1, R2, or R3. However, the invention is not limited to this. That is, even when resetting is executed during the initial check, the main microcomputer 50 as a whole may be reset by outputting the reset signal R.

In the present embodiment, during the initial check at the time of switch-on of the ignition, the monitoring target signal is made quasi-abnormal to allow checking of the reset paths C1 to C3 for soundness. However, the invention is not limited to this. For example, the reset paths C1 to C3 may be checked for soundness after the ignition is switched off and before the ECU 40 is powered off.

In the present embodiment, the vehicular control apparatus is embodied in the ECU 40 in the EPS 10. However, the vehicular control apparatus may be used for applications other than the EPS 10. For example, the vehicular control apparatus may be applied to an ECU for any other in-vehicle system such as a steer-by-wire system.

What is claimed is:
1. A vehicular control apparatus comprising:
a control circuit that controls an operation of a vehicle to generate a plurality of signals;
a monitoring circuit that monitors the signals to monitor an operation of the control circuit;

an abnormality causing circuit that selects one of the signals directly from the control circuit and that causes a quasi-abnormality in the selected signal; and a reset determining circuit that resets the control circuit when the selected signal is determined to be abnormal, wherein the abnormality causing circuit switches the signal to be brought into a quasi-abnormal state from the selected signal to another signal each time the vehicle is powered on.

2. The vehicular control apparatus according to claim 1, wherein the reset determining circuit is provided in the monitoring circuit.

3. The vehicular control apparatus according to claim 1, wherein the monitoring circuit generates signals similar to the signals generated by the control circuit, and an abnormality determining circuit is provided which determines whether each of the signals generated by the control circuit is abnormal by comparing the signal generated by the control circuit with corresponding one of the signals generated by the monitoring circuit.

4. The vehicular control apparatus according to claim 1, wherein the control circuit has a plurality of signal generating circuits each generating one of the signals in the control circuit, and the reset determining circuit resets one of the signal generating circuits that generates the selected signal when the selected signal is determined to be abnormal.

5. The vehicular control apparatus according to claim 1, wherein, the control circuit has a clock generating circuit that generates a clock signal and an arithmetic circuit that calculates an controlled variable of the vehicle, the arithmetic circuit has an internal watchdog circuit that generates an internal watchdog signal for monitoring an operation of the arithmetic circuit and an external monitoring circuit for monitoring an arithmetic function of the arithmetic circuit based on a request from the monitoring circuit, and the signals monitored by the monitoring circuit are the clock signal generated by the clock generating circuit, the internal watchdog signal generated by the internal watchdog circuit, and an external monitoring signal generated by the external monitoring circuit.

* * * * *